United States Patent
Park

(10) Patent No.: US 7,135,527 B2
(45) Date of Patent: Nov. 14, 2006

(54) ELASTOMERIC COMPOSITIONS CONTAINING FLUOROPOLYMER BLENDS

(75) Inventor: Edward Hosung Park, Saline, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 102 days.

(21) Appl. No.: 10/813,527

(22) Filed: Mar. 30, 2004

(65) Prior Publication Data

US 2005/0222337 A1    Oct. 6, 2005

(51) Int. Cl.
C08F 259/08    (2006.01)
C08F 214/22    (2006.01)
C08F 214/26    (2006.01)

(52) U.S. Cl. ............ 525/199; 525/200; 525/276; 524/463; 524/544; 524/545; 524/546

(58) Field of Classification Search ........... 525/199, 525/200, 276; 524/463, 544, 545, 546, 46
See application file for complete search history.

(56) References Cited

U.S. PATENT DOCUMENTS

| | | | |
|---|---|---|---|
| 3,037,954 A | 6/1962 | Gessler et al. | |
| 4,035,565 A | 7/1977 | Apotheker et al. | |
| 4,287,320 A | 9/1981 | Kolb | |
| 4,450,263 A | 5/1984 | West | |
| 4,696,989 A | 9/1987 | Oka et al. | |
| 4,787,991 A | 11/1988 | Morozumi et al. | |
| 5,006,594 A * | 4/1991 | Rees .......................... | 524/520 |
| 5,206,293 A | 4/1993 | Sakai et al. | |
| 5,354,811 A | 10/1994 | Kamiya et al. | |
| 5,384,374 A | 1/1995 | Guerra et al. | |
| 6,066,697 A | 5/2000 | Coran et al. | |
| 6,310,141 B1 | 10/2001 | Chen et al. | |
| 6,407,174 B1 | 6/2002 | Ouhadi | |
| 6,429,249 B1 | 8/2002 | Chen et al. | |
| 6,437,030 B1 | 8/2002 | Coran et al. | |
| 6,624,251 B1 | 9/2003 | Chmielewski | |

FOREIGN PATENT DOCUMENTS

EP    0 168 020 B1    10/1989

OTHER PUBLICATIONS

Schmiegel, Walter W., "A Review of Recent Progress in the Design and Reactions of Base-Resistant Fluoroelastomers.", IRC, Jul. 2003.
"AFLAS™ The Fluoroelastomer", Asahi Glass Company, Product Information, pp. 1-8, Apr. 11, 2003.
"Fluorine-Containing Polymers", Encyclopedia of Polymer Science & Engineering, vol. 7, 1987, Second Edition, pp. 256-267.
"Viton® Fluoroelasotmer, A Product of DuPont Dow Elastomers", Technical Information, DuPont Dow Elastomers, Copyright 1988.
Michael J. Moore, "Silanes as Rubber-to-Metal Bonding Agents", 160th Meeting of the Rubber Division, American Chemical Society, Cleveland Ohio, Paper No. 105, pp. 1-17, 2001.

* cited by examiner

Primary Examiner—James J. Seidleck
Assistant Examiner—Olga Asinovsky
(74) Attorney, Agent, or Firm—Ronald W. Wangerow; Harness, Dickey & Pierce, PLC

(57) ABSTRACT

Processable rubber compositions contain a vulcanized fluorocarbon elastomer dispersed in a thermoplastic matrix comprising a fully fluorinated polymer and a partially fluorinated polymer. The processing temperature is below the melting point of the fully fluorinated polymer. The compositions are made by combining a curative, uncured fluorocarbon elastomer, a fully fluorinated thermoplastic, and a partially fluorinated thermoplastic material, and heating the mixture at a temperature and for a time sufficient to effect vulcanization of the elastomeric material, while mechanical energy is applied to mix the mixture during the heating step. Shaped articles such as seals, gaskets, O-rings, and hoses may be readily formed from the rubber compositions according to conventional thermoplastic processes such as blow molding, injection molding, and extrusion.

14 Claims, No Drawings

ELASTOMERIC COMPOSITIONS CONTAINING FLUOROPOLYMER BLENDS

The present invention relates to fluorine containing elastomer compositions.

Cured elastomers or rubbers have a variety of physical properties useful for applications in molded articles. Among the properties are a high degree of flexibility, elasticity, and resistance to compression set. As such they find use in a variety of applications, such as seals and gaskets. Uncured elastomers or rubbers are in the form of a resin or gum. To obtain a molded article with suitable elastomeric properties, the uncured resins are crosslinked or cured with a variety of crosslinking agents.

For conventional elastomers, cure is generally carried out in a mold under conditions of temperature and pressure suitable for forming a cured or partially cured article. Because the curing reaction produces a thermoset material, conventional rubber compositions cannot be processed after the elastomer is cured.

Dynamically vulcanized rubbers are prepared by carrying out the crosslinking reaction while the elastomer is stirred or mixed together with a thermoplastic material. The resulting composition may be further melt processed, even after cure of the elastomer is complete. Molded articles made from the compositions have elastomeric properties, yet the compositions may be thermally or melt processed according to conventional thermoplastic techniques.

In thermoplastic techniques, a processable composition is first melted and then held above the melting temperature for quite a time before shaped articles are fabricated. The processing temperature depends on the melt behavior of the compositions, which is largely determined by the thermoplastic material. Thermoplastics with a high fluorine content are preferred for some applications due to the high chemical stability of the composition. Such high fluorine thermoplastics are characterized by relatively high melting temperatures.

During processing, the cured elastomer is subject to a high temperature, which may be above a temperature at which the cured elastomer is stable. Prolonged exposure to high temperatures can degrade a cured elastomer. A drawback of using fluorinated thermoplastics in such processable compositions is that their melting point is generally higher than the stability range of the cured elastomer. The melting temperature can be lowered by using a partially fluorinated polymer, but the lower fluorine content may lead to having solvent resistance and other properties below the preferred levels for the application.

It would be desirable to provide compositions that exhibit a high level of solvent resistance and other properties, along with highly developed elastomeric properties.

SUMMARY

A processable rubber composition comprises a cured fluorocarbon elastomer dispersed in a matrix comprising a thermoplastic material. The thermoplastic material is a fluoroplastic blend containing a fully fluorinated thermoplastic polymer and a partially fluorinated thermoplastic polymer. In various embodiments, the cured elastomer makes up 35% by weight or more of the composition. The composition preferably exhibits a single melting temperature, as determined for example by differential scanning calorimetry, which is below that of the high melting fully fluorinated polymer of the fluoroplastic blend. At the same time, the fluorine content of the thermoplastic is above 60%, and preferably above 65%.

Methods for making the processable rubber composition involve mixing an elastomeric component and a thermoplastic component in the presence of a curative agent and heating during mixing to effect cure of the elastomeric component. In preferred embodiments, the elastomeric component is a fluorocarbon elastomer and the thermoplastic component is a fluoroplastic blend as described above. Shaped articles may be made by melt processing the rubber compositions with conventional thermoplastic techniques. Such techniques involve melting and processing the rubber compositions at temperatures below the melting point of the fully fluorinated polymer, and preferably below 280° C.

Suitable fluorocarbon elastomers include those that are curable with phenol or peroxide curing agents, and those designated as FKM, FFKM, and FTPM. The fluoroplastic blend preferably contains a fully fluorinated polymer selected from the group consisting of PFA, MFA, and FEP, and a partially fluorinated polymer selected from the group consisting of polyvinylidene fluoride, copolymers of vinylidene fluoride, ETFE, and ECTFE.

DETAILED DESCRIPTION

The following description of the preferred embodiment(s) is merely exemplary in nature and is in no way intended to limit the invention, its application, or uses.

The headings (such as "Introduction" and "Summary,") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations of the stated features. Specific Examples are provided for illustrative purposes of how to make, use and practice the compositions and methods of this invention and, unless explicitly stated otherwise, are not intended to be a representation that given embodiments of this invention have, or have not, been made or tested.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other preferred embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

The terms "elastomeric material, elastomer" and the like refer to chemical compositions that possess, or can be modified (i.e. cured or crosslinked) to possess elastomeric properties. According to context, the terms refer to an uncured or partially cured material, in which elastomeric properties are not fully developed, or to a cured rubber-like material, with fully developed elastomeric properties. At some points in the specification, the terms are used with adjectives such as "cured, partially cured, or uncured" for clarity.

The terms "curing agent, curative, curative agent," and the like are used interchangeably to designate the chemical compound or composition that reacts with the (uncured) elastomer to form a cured elastomer and to develop the elastomeric properties of the cured product. According to context it is used to refer to a formal curing initiator (e.g. a radical initiator such as a peroxide) as well as a crosslinking agent that may be used in conjunction with the initiator (e.g. triallylisocyanurate). At some points, the term "curing system" or the like is used to refer to a combination of initiator and crosslinker and optional additional components used in the curing. It is to be understood that often the curing system is provided by an elastomer supplier (and may be incorporated into the elastomer), and may be used according to the manufacturer's instructions.

According to one embodiment of the invention, a processable rubber composition is provided comprising a cured fluorocarbon elastomer dispersed in a matrix comprising a thermoplastic material, wherein the thermoplastic material comprises a fully fluorinated thermoplastic polymer and a partially fluorinated thermoplastic polymer and the cured fluorocarbon elastomer is present at a level of greater than or equal to 35% by weight based on the total weight of cured fluorocarbon elastomer and thermoplastic material. In various embodiments, the cured elastomer is 40% or more, or 50% or more by weight of the total.

In another aspect, a processable rubber composition is provided comprising a cured fluorocarbon elastomer dispersed in a thermoplastic matrix, wherein the thermoplastic matrix comprises a fully fluorinated thermoplastic polymer and a partially fluorinated thermoplastic polymer and the cured fluorocarbon elastomer is present as a discrete phase or a phase co-continuous with the matrix. The dimensions of the elastomer phase are less than 10 µm, as measured by atomic force microscopy on cryogenically microtomed cross-sections of shaped articles formed from the processable rubber composition. In various embodiments, the dimensions are less than 1 µm.

In another embodiment, methods for making a processable rubber composition are provided comprising mixing an elastomeric component and a thermoplastic component in the presence of a curative agent and heating during mixing to effect cure of the elastomeric component, wherein the elastomeric material comprises a fluorocarbon elastomer; and the thermoplastic material is a fluoroplastic blend comprising a fully fluorinated thermoplastic polymer and a partially fluorinated thermoplastic polymer.

The compositions of the invention are based on a fluoroplastic blend comprising a fully fluorinated polymer and a partially fluorinated polymer. The fluoroplastic blend preferably contains 10–90% by weight of the fully fluorinated polymer, and 10–90% by weight of the partially fluorinated polymer. The weight ratio of the fully fluorinated polymer to the partially fluorinated polymer preferably ranges from 1:9 to 9:1. The compositions preferably exhibit a single melt temperature below 305° C., and preferably below 250° C. They may be melt processed and fabricated into shaped articles with thermoplastic techniques operating below the melting temperature of the fully fluorinated polymer of the fluoroplastic blend.

In one aspect, the method is carried out by forming a mixture by combining the curative, an uncured or partially cured elastomeric material, and the thermoplastic material and heating the mixture at a temperature and for a time sufficient to effect vulcanization of the elastomeric material, wherein mechanical energy is applied to mix the mixture during the heating step. In another aspect, the method comprises mixing the elastomeric material and the thermoplastic material for a time and at a shear rate sufficient to form a dispersion of the elastomeric material in a continuous thermoplastic phase, adding a curative to the dispersion while continuing the mixing, and heating the dispersion while continuing to mix the curative, elastomeric material, and thermoplastic material.

A shaped article is also provided, comprising a cured fluorocarbon elastomer dispersed in a matrix comprising a thermoplastic material, wherein the thermoplastic material comprises 10–90% by weight of a fully fluorinated thermoplastic polymer and 10–90% by weight of a partially fluorinated thermoplastic polymer. In preferred embodiments, the hardness of the article is Shore A 50 or greater, preferably about 60 to about 80 Shore A; the tensile strength of the article is 4 MPa or greater, preferably about 5 to about 7 MPa; the modulus at 100% of the article is 4 MPa or greater, preferably about 6 to about 8 MPa; or the elongation at break of the article is 10% or greater, preferably about 100% to about 200%. Non-limiting examples are molded seals, gaskets, and o-rings, as well as extruded hoses. Shaped articles are made by further processing of the rubber compositions described above at temperatures below the melting point of the fully fluorinated polymer.

In another embodiment, a method for reducing costs of a manufacturing process for making shaped rubber articles from a processable rubber composition comprises recycling scrap material generated during the manufacturing process to make new shaped articles comprising the processable rubber composition, wherein the rubber composition is as described above. The manufacturing processes include conventional thermoplastic techniques such as blow molding, injection molding, and extrusion. The recycling step involves melting the processable composition at a temperature that is lower than the melting temperature of the fully fluorinated polymer in the thermoplastic material.

Fluorocarbon elastomers are curable compositions based on fluorine-containing polymers. Various types of fluoroelastomers may be used. One classification of fluoroelastomers is given in ASTM-D 1418, "Standard practice for rubber and rubber latices-nomenclature". The designation FKM is given for fluoro-rubbers that utilize vinylidene fluoride as a co-monomer. Several varieties of FKM fluoroelastomers are commercially available. A first variety may be chemically described as a copolymer of hexafluoropropylene and vinylidene fluoride. These FKM elastomers tend to have an advantageous combination of overall properties. Some commercial embodiments are available with about 66% by weight fluorine. Another type of FKM elastomer may be chemically described as a terpolymer of tetrafluoroethylene, hexafluoropropylene, and vinylidene fluoride. Such elastomers tend to have high heat resistance and good resistance to aromatic solvents. They are commercially available with, for example 68–69.5% by weight fluorine. Another FKM elastomer is chemically described as a terpolymer of tetrafluoroethylene, a fluorinated vinyl ether, and vinylidene fluoride. Such elastomers tend to have improved low temperature performance. They are available with 62–68% by weight fluorine. A fourth type of FKM elastomer is described as a terpolymer of tetrafluoroethylene, propylene, and vinylidene fluoride. Such FKM elastomers tend to have improved base resistance. Some commercial embodiments contain about 67% weight fluorine. A fifth type of FKM elastomer may be described as a pentapolymer of tetrafluoroethylene, hexafluoropropylene, ethylene, a fluorinated vinyl ether and vinylidene fluoride. Such elastomers typically have improved base resistance and have improved low temperature performance.

Another category of fluorocarbon elastomers is designated as FFKM. These elastomers may be designated as perfluoroelastomers because the polymers are completely fluorinated and contain no carbon hydrogen bond. As a group, the FFKM fluoroelastomers tend to have superior fluid resistance. They were originally introduced by DuPont under the Kalrez® trade name. Additional suppliers include Daikin and Ausimont.

A third category of fluorocarbon elastomer is designated as FTPM. Typical of this category are the copolymers of propylene and tetrafluoroethylene. The category is characterized by a high resistance to basic materials such as amines.

Preferred fluorocarbon elastomers include commercially available copolymers of one or more fluorine containing monomers, chiefly vinylidene fluoride (VDF), hexafluoropropylene (HFP), tetrafluoroethylene (TFE), and perfluorovinyl ethers (PFVE). Preferred PFVE include those with a $C_{1-8}$ perfluoroalkyl group, preferably perfluoroalkyl groups with 1 to 6 carbons, and particularly perfluoromethyl vinyl ether and perfluoropropyl vinyl ether. In addition, the copolymers may also contain repeating units derived from olefins such as ethylene (Et) and propylene (Pr). The copolymers may also contain relatively minor amounts of cure site monomers (CSM), discussed further below. Preferred copolymer fluorocarbon elastomers include VDF/HFP, VDF/HFP/CSM, VDF/HFP/TFE, VDF/HFP/TFE/CSM, VDF/PFVE/TFE/CSM, TFE/Pr, TFE/Pr/VDF, TFE/Et/PFVE/VDF/CSM, TFE/Et/PFVE/CSM and TFE/PFVE/CSM. The elastomer designation gives the monomers from which the elastomer gums are synthesized. In various embodiments, the elastomer gums have viscosities that give a Mooney viscosity in the range generally of 15–160 (ML1+ 10, large rotor at 121° C.), which can be selected for a combination of flow and physical properties. Elastomer suppliers include Dyneon (3M), Asahi Glass Fluoropolymers, Solvay/Ausimont, Dupont, and Daikin.

In a preferred embodiment, the elastomeric material comprises repeating units derived from 10–90 mole % tetrafluoroethylene, 10–90 mole % $C_{2-4}$ olefin, and up to 30 mole % of one or more additional fluorine-containing monomers. Preferably, the repeating units are derived from 25–90 mole % tetrafluoroethylene and 10–75 mole % $C_{2-4}$ olefin. In another preferred embodiment, the repeating units are derived from 45–65 mole % tetrafluoroethylene and 20–55 mole % $C_{2-4}$ olefin.

In various embodiments, the molar ratio of tetrafluoroethylene units to $C_{2-4}$ olefin repeating units is from 60:40 to 40:60. In another embodiment, the elastomeric material comprises alternating units of $C_{2-4}$ olefins and tetrafluoroethylene. In such polymers the molar ratio of tetrafluoroethylene to $C_{2-4}$ olefin is approximately 50:50.

In another embodiment, the elastomeric materials are provided as block copolymers having an A-B-A structure, wherein A represents a block of poly-tetrafluoroethylene and B represents a block of polyolefin.

A preferred $C_{2-4}$ olefin is propylene. Elastomeric materials based on copolymers of tetrafluoroethylene and propylene are commercially available, for example from Asahi under the Aflas® trade name.

A preferred additional monomer in the vulcanized elastomeric material is vinylidene difluoride. Other fluorine-containing monomers that may be used in the elastomeric materials of the invention include without limitation, perfluoroalkyl vinyl compounds, perfluoroalkyl vinylidene compounds, and perfluoroalkoxy vinyl compounds. Hexafluoropropylene (HFP) is an example of perfluoroalkyl vinyl monomer. Perfluoromethyl vinyl ether is an example of a preferred perfluoroalkoxy vinyl monomer. For example, rubbers based on copolymers of tetrafluoroethylene, ethylene, and perfluoromethyl vinyl ether are commercially available from Dupont under the Viton® ETP trade name.

In another embodiment, the elastomeric materials are curable fluorocarbon elastomers containing repeating units derived from fluoromonomers vinylidene fluoride (VDF) and hexafluoropropylene (HFP). In some embodiments, the elastomers further contain repeating units derived from tetrafluoroethylene.

Chemically, in this embodiment the elastomeric material is made of copolymers of VDF and HFP, or of terpolymers of VDF, HFP, and tetrafluoroethylene (TFE), with optional cure site monomers. In preferred embodiments, they contain about 66 to about 70% by weight fluorine. The elastomers are commercially available, and are exemplified by the Viton® A, Viton® B, and Viton® F series of elastomers from DuPont Dow Elastomers. Grades are commercially available containing the gum polymers alone, or as curative-containing pre-compounds.

In another embodiment, the elastomers can be described chemically as copolymers of TFE and PFVE, optionally as a terpolymer with VDF. The elastomer may further contain repeating units derived from cure site monomers.

Fluorocarbon elastomeric materials used to make the processable rubber compositions of the invention may typically be prepared by free radical emulsion polymerization of a monomer mixture containing the desired molar ratios of starting monomers. Initiators are typically organic or inorganic peroxide compounds, and the emulsifying agent is typically a fluorinated acid soap. The molecular weight of the polymer formed may be controlled by the relative amounts of initiators used compared to the monomer level and the choice of transfer agent if any. Typical transfer agents include carbon tetrachloride, methanol, and acetone. The emulsion polymerization may be conducted under batch or continuous conditions. Such fluoroelastomers are commercially available as noted above.

In various embodiments, the fluoroelastomers of the composition of the invention also comprise at least one halogenated cure site or a reactive double bond resulting from the presence of a copolymerized unit of a non-conjugated diene. In various embodiments, the fluorocarbon elastomers contain up to 5 mole % and preferably up to 3 mole % of repeating units derived from the so-called cure site monomers.

The cure site monomers are preferably selected from the group consisting of brominated, chlorinated, and iodinated olefins; brominated, chlorinated, and iodinated unsaturated ethers; and non-conjugated dienes. Halogenated cure sites may be copolymerized cure site monomers or halogen atoms that are present at terminal positions of the fluoroelastomer polymer chain. The cure site monomers, reactive double bonds or halogenated end groups are capable of reacting to form crosslinks.

The brominated cure site monomers may contain other halogens, preferably fluorine. Examples are bromotrifluoroethylene, 4-bromo-3,3,4,4-tetrafluorobutene-1 and others such as vinyl bromide, 1-bromo-2,2-difluoroethylene, perfluoroallyl bromide, 4-bromo-1,1,2-trifluorobutene, 4-bromo-1,1,3,3,4,4,-hexafluorobutene, 4-bromo-3-chloro-1,1,3,4,4-pentafluorobutene, 6-bromo-5,5,6,6-tetrafluorohexene, 4-bromoperfluorobutene-1 and 3,3-difluoroallyl bromide. Brominated unsaturated ether cure site monomers useful in the invention include ethers such as 2-bromo-perfluoroethyl perfluorovinyl ether and fluorinated compounds of the class $CF_2Br—R_f—O—CF=CF_2$ ($R_f$ is perfluoroalkylene), such as $CF_2BrCF_2O—CF=CF_2$, and fluorovinyl ethers of the class $ROCF=CFBr$ or $ROCBr=CF_2$, where R is a lower alkyl group or fluoroalkyl group, such as $CH_3OCF=CFBr$ or $CF_3CH_2OCF=CFBr$.

Iodinated olefins may also be used as cure site monomers. Suitable iodinated monomers include iodinated olefins of the formula: $CHR=CH-Z-CH_2CHR—I$, wherein R is $—H$ or $—CH_3$; Z is a $C_1–C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF=CF_2$ and $ICH_2CF_2O[CF(CF_3)CF_2O]_nCF=CF_2$, and the like, wherein n=1–3, such as disclosed in U.S. Pat. No. 5,717,036. In addition, suitable iodinated cure site monomers including iodoethylene, 4-iodo-3,3,4,4-tetrafluorobutene-1; 3-chloro-4-iodo-3,3,4,-trifluorobutene; 2-iodo-1,1,2,2-tetrafluoro-1-(vinyloxy) ethane; 2-iodo-1-(perfluorovinyloxy)-1,1,2,2-tetrafluoroethylene; 1,1,2,3,3 3-hexafluoro-2-iodo-1-(perfluorovinyloxy) propane; 2-iodoethyl vinyl ether; 3,3,4,5,5,5-hexafluoro-4-iodopentene; and iodotrifluoroethylene are disclosed in U.S. Pat. No. 4,694,045.

Examples of non-conjugated diene cure site monomers include 1,4-pentadiene, 1,5-hexadiene, 1,7-octadiene and others, such as those disclosed in Canadian Patent 2,067,891. A suitable triene is 8-methyl-4-ethylidene-1,7-octadiene.

Of the cure site monomers listed above, preferred compounds include 4-bromo-3,3,4,4-tetrafluorobutene-1; 4-iodo-3,3,4,4-tetrafluorobutene-1; and bromotrifluoroethylene.

Additionally, or alternatively, iodine, bromine or mixtures thereof may be present at the fluoroelastomer chain ends as a result of the use of chain transfer or molecular weight regulating agents during preparation of the fluoroelastomers. Such agents include iodine-containing compounds that result in bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,4-diiodoperfluorobutane; 1,6-diiodoperfluorohexane; 1,3-diiodo-2-chloroperfluoropropane; 1,2-di(iododifluoromethyl)perfluorocyclobutane; monoiodoperfluoroethane; monoiodoperfluorobutane; and 2-iodo-1-hydroperfluoroethane. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Additionally, or alternatively, iodine, bromine or mixtures thereof may be present at the fluoroelastomer chain ends as a result of the use of chain transfer or molecular weight regulating agents during preparation of the fluoroelastomers. Such agents include iodine-containing compounds that result in bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,4-diiodoperfluorobutane; 1,6-diiodoperfluorohexane; 1,3-diiodo-2-chloroperfluoropropane; 1,2-di(iododifluoromethyl)perfluorocyclobutane; monoiodoperfluoroethane; monoiodoperfluorobutane; and 2-iodo-1-hydroperfluoroethane. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Other cure monomers may be used that introduce low levels, preferably less than or equal about 5 mole %, more preferably less than or equal about 3 mole %, of functional groups such as epoxy, carboxylic acid, carboxylic acid halide, carboxylic ester, carboxylate salts, sulfonic acid groups, sulfonic acid alkyl esters, and sulfonic acid salts. such monomers and cure are described for example in Kamiya et al., U.S. Pat. No. 5,354,811.

Fluorocarbon elastomers based on cure site monomers are commercially available. Non-limiting examples include Viton GF, GLT-305, GLT-505, GBL-200, and GBL-900 grades from DuPont. Others include the G-900 and LT series from Daikin, the FX series and the RE series from NOK, and Tecnoflon P457 and P757 from Solvay.

The fluorocarbon elastomers are dynamically vulcanized in the presence of a fluoroplastic blend. The blend contains a fully fluorinated polymer and a partially fluorinated polymer such as a thermoplastic homo- or copolymer of vinylidene fluoride. The blend may contain minor amounts of a non-fluorine containing polymer, but the amount is limited by the requirement that the blend remain compatible, giving a homogeneous thermoplastic phase, and exhibiting the melting point behavior discussed below. In various embodiments, the ratio of fully fluorinated to partially fluorinated polymers in the fluoroplastic blend ranges from 9:1 to 1:9. In various embodiments, the blend comprises from about 10 to about 90 parts, from about 20 to about 80 parts, from about 25 parts to about 75 parts, from about 33 to about 67 parts, from about 40 to about 60 parts, or about 50 parts of one of the components, with the other component present at a level to bring it up to 100 parts. In embodiments where no other polymers are present in the fluoroplastic blend except the fully fluorinated and partially fluorinated polymers, the parts correspond to % by weight of the total weight of the fluoroplastic blend.

In another aspect, the fluoroplastic blend comprises two fluoropolymers, one with greater than 65 wt % fluorine content, the other with less than 65 wt % fluorine content. The two fluoropolymers are present in the same ratios as stated above. In a preferred embodiment, the polymer with greater than 65% fluorine is fully fluorinated.

As discussed below, processable rubber compositions made from the fluoroplastic blend exhibit a DSC melting temperature lower than that of the fully fluorinated polymer of the blend. In various embodiments, the DSC melting temperature is below 305° C., below 290° C., below 260° C., or below 250° C. In a preferred embodiment, the melting temperature is below 240° C. Thus, in various embodiments, the processable rubber compositions will have a melting point of less than 305° C. and a continuous phase with a fluorine content of greater than 60 wt %. Preferably the fluorine content will be greater than 65 wt % and a melting point below 290° C., below 260° C., or preferably below 250° C. In another preferred embodiment, the compositions exhibit a melting point below 240° C.

Thermoplastic fluorine-containing polymers may be selected from a wide range of polymers and commercial products. The polymers are melt processable—they soften and flow when heated, and can be readily processed in thermoplastic techniques such as injection molding, extrusion, compression molding, and blow molding. The materials are readily recyclable by melting and re-processing. Commercial embodiments are available which contain 59 to 76% by weight fluorine.

Fully fluorinated thermoplastic polymers include copolymers of tetrafluoroethylene and perfluoroalkyl vinyl ethers. The perfluoroalkyl group is preferably of 1 to 6 carbon atoms. Examples of copolymers are PFA (copolymer of TFE and perfluoropropyl vinyl ether) and MFA (copolymer of TFE and perfluoromethyl vinyl ether). Other examples of fully fluorinated thermoplastic polymers include copolymers of TFE with perfluoro olefins of 3 to 8 carbon atoms. Non-limiting examples include FEP (copolymer of TFE and hexafluoropropylene).

Partially fluorinated thermoplastic polymers include E-TFE (copolymer of ethylene and TFE), E-CTFE (copolymer of ethylene and chlorotrifluoroethylene), and PVDF (polyvinylidene fluoride). A number of thermoplastic copolymers of vinylidene fluoride are also suitable thermoplastic polymers for use in the invention. These include, without limitation, copolymers with perfluoroolefins such as hexafluoropropylene, and copolymers with chlorotrifluoroethylene. Thermoplastic terpolymers may also be used. These include thermoplastic terpolymers of TFE, HFP, and vinylidene fluoride. Fully fluorinated fluoroplastics are characterized by relatively high melting points, when compared to the vinylidene fluoride based thermoplastics that are also included in the fluoroplastic blend of the invention. As examples, PFA has a melting point of about 305° C., MFA has a melting point of 280–290° C., and FEP has a melting point of about 260–290° C. The melting point of individual grades depends on the exact structure, processing conditions, and other factors, but the values given here are representative. A consequence of a high melting point is that thermoplastic processing techniques, such as blow molding, injection molding, and extrusion need to be carried out at temperatures above the relatively high melting point. In the case of thermoplastic processing of compositions containing a cured elastomer, the elastomer is exposed for extended periods of time to the relatively temperature required to melt the thermoplastic and make it flow. Many elastomers are adversely affected by the high temperatures, and suffer degradation.

Partially fluorinated fluoroplastics such as the vinylidene fluoride homo- and copolymers described above have relatively lower melting points than the fully fluorinated fluoroplastics. For example, polyvinylidene fluoride has a melting point of about 160–170° C. Some copolymer thermoplastics have an even lower melting point, due to the presence of a small amount of co-monomer. For example, a vinylidene fluoride copolymer with a small amount of hexafluoropropylene, exemplified in a commercial embodiment such as the Kynar Flex series, exhibits a melting point in the range of about 105–160° C., and typically about 130° C. These low melting points lead to advantages in thermoplastic processing, as lower temperatures of melting lead to lower energy costs and avoidance of the problem of degradation of cured elastomers in the compositions. One drawback of the partially fluorinated polymers for some applications is their relatively low fluorine content. Polyvinylidene fluoride has only about 59% by fluorine, while the fully fluorinated polymers have fluorine content from about 71% (MFA) to about 76% (FEP). In some applications, a higher fluorine content is desirable for contributing to increased solvent resistance and other properties.

The fluoroplastic blend provides advantages over compositions consisting of mostly partially fluorinated polymers, in that the fluorine content of the blend is higher, which leads to better solvent resistance and other properties in shaped articles made from the compositions. The fluorine content of the blend is essentially the weighted average of the fluorine contents of the individual components. As a non-limiting example, a 50/50 blend of FEP (76% F) and polyvinylidene fluoride (59% F) is about (59+76)/2, or 67.5% fluorine.

Processable rubber compositions of the invention that contain the fluoroplastic blend as the continuous phase preferably exhibit a single melting temperature, when measured for example by differential scanning calorimetry (DSC). Advantageously, the melting of the blend is intermediate between that of the fully fluorinated and partially fluorinated polymers. For example, the DSC melting point of dynamic vulcanizate made from 50/50 PVDF (mp 160° C.) and PFA (mp 305° C.) was about 235° C. Because such compositions can be subsequently processed at lower temperatures than the melting point of the fully fluorinated polymer, degradation temperatures of the cured fluoroelastomers can be avoided in subsequent thermoplastic processing of the compositions.

In a preferred embodiment, a fluorocarbon elastomer is cured in the presence of a mixture of a fully fluorinated and partially fluorinated thermoplastic polymer (i.e., the "fluoroplastic blend" described above) to form a dynamic vulcanizate containing particles of cured fluoroelastomer. The dynamic vulcanization is preferably carried out at a temperature above the melting point of the higher melting component, i.e. the fully fluorinated polymer. This exposes the curing and cured fluoroelastomer to relatively high temperatures, but only for a brief period of time required to cure the elastomer. After the processable rubber composition is thus formed, it can be subsequently processed in thermoplastic techniques at a temperature at or slightly above (for example, 10 to 30° C. higher) the DSC melting point exhibited by the composition, which is lower than that of the fully fluorinated polymer.

Useful curative agents include diamines, peroxides, and polyol/onium salt combinations. Diamine curatives are relatively slow curing, but offer advantages in several areas. Such curatives are commercially available, for example as Diak-1 from DuPont Dow Elastomers.

Peroxide curative contains an organic peroxide. The peroxide is believed to function by first extracting a hydrogen or halogen atom from the fluorocarbon elastomer to create a free radical that can be crosslinked. The peroxide curative preferably also contains a crosslinker. In various embodiments, the crosslinker contains at least two sites of olefinic unsaturation, which react with the free radical on the fluorocarbon elastomer molecule generated by the reaction of peroxide.

A wide range of organic peroxides is known and commercially available. The organic peroxides are activated over a wide range of temperatures. The activation temperature of the peroxides may be described in a parameter known as half-life. Typically values for half-lives of, for example, 0.1 hours, 1 hour, and 10 hours are given in degrees centigrade. For example a $T_{1/2}$ at 0.1 hours of 143° C. indicates that at that temperature, half of the peroxide will decompose within 0.1 hours. Organic peroxides with a $T_{1/2}$ at 0.1 hours from 118° C. to 228° C. are commercially available. The $T_{1/2}$ values indicate the kinetics of the initial reaction in crosslinking the fluorocarbon elastomers, that is decomposition of the peroxide to form a radical containing intermediate.

In some embodiments, the $T_{1/2}$ of the organic peroxide may be matched to the temperature of the molten material into which the peroxide is to be added. Non-limiting examples of commercially available organic peroxides for initiating the cure of fluorocarbon elastomers include butyl 4,4-di-(tert-butylperoxy)valerate; tert-butyl peroxybenzoate; di-tert-amyl peroxide; dicumyl peroxide; di-(tert-butylperoxyisopropyl)benzene; 2,5-dimethyl-2,5-di(tert-butylperoxy)hexane; tert-butyl cumyl peroxide; 2,5,-dimethyl-2,5-di(tert-butylperoxy)hexyne-3; di-tert-butyl peroxide; 3,6,9-triethyl-3,6,9-trimethyl-1,4,7-triperoxonane; 1,1,3,3-tetramethylbutyl hydroperoxide; diisopropylbenzene monohydroperoxide; cumyl hydroperoxide; tert-butyl hydroperoxide; tert-amyl hydroperoxide; tert-butyl peroxyisobutyrate; tert-amyl peroxyacetate; tert-butylperoxy stearyl carbonate; di(1-hydroxycyclohexyl) peroxide; ethyl 3,3-di(tert-butylperoxy)butyrate; and tert-butyl 3-isopropenylcumyl peroxide.

One or more crosslinking co-agents may be combined with the peroxide. Non-limiting examples include triallyl cyanurate; triallyl isocyanurate; tri(methallyl)-isocyanurate; tris(diallylamine)-s-triazine, triallyl phosphite; N,N-diallyl acrylamide; hexaallyl phosphoramide; N,N,N',N'-tetraallyl terephthalamide; N,N,N',N'-tetraallyl malonamide; trivinyl isocyanurate; 2,4,6-trivinyl methyltrisiloxane; and tri(5-norbornene-2-methylene) cyanurate. The crosslinking coagents contain at least two sites of olefinic unsaturation. These sites of unsaturation react with the free radical generated on the fluorocarbon elastomer molecule and crosslink the elastomer. A commonly used crosslinking agent is triallylisocyanurate (TAIC).

Suitable onium salts are described, for example, in U.S. Pat. Nos. 4,233,421; 4,912,171; and 5,262,490. Examples include triphenylbenzyl phosphonium chloride, tributyl alkyl phosphonium chloride, tributyl benzyl ammonium chloride, tetrabutyl ammonium bromide, and triarylsulfonium chloride.

Another class of useful onium salts is represented by the following formula:

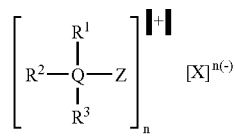

where

Q is nitrogen or phosphorus;

Z is a hydrogen atom or is a substituted or unsubstituted, cyclic or acyclic alkyl group having from 4 to about 20 carbon atoms that is terminated with a group of the formula —COOA where A is a hydrogen atom or a $NH_4^+$ cation or Z is a group of the formula —$CY_2COOR'$ where Y is a hydrogen or halogen atom, or is a substituted or unsubstituted alkyl or aryl group having from 1 to about 6 carbon atoms that may optionally contain one or more quaternary heteroatoms and where R' is a hydrogen atom, a $NH_4^+$ cation, an alkyl group, or is an acyclic anhydride, e.g., a group of the formula —COR where R is an alkyl group or is a group that itself contains organo-onium (i.e., giving a bis-organo-onium); preferably R' is hydrogen; Z may also be a substituted or unsubstituted, cyclic or acyclic alkyl group having from 4 to about 20 carbon atoms that is terminated with a group of the formula —COOA where A is a hydrogen atom or is a $NH_4^+$ cation;

$R_1$, $R_2$, and $R_3$ are each, independently, a hydrogen atom or an alkyl, aryl, alkenyl, or any combination thereof, each $R_1$, $R_2$, and $R_3$ can be substituted with chlorine, fluorine, bromine, cyano, —OR", or —COOR" where R" is a $C_1$ to $C_{20}$ alkyl, aryl, aralkyl, or alkenyl, and any pair of the $R_1$, $R_2$, and $R_3$ groups can be connected with each other and with Q to form a heterocyclic ring; one or more of the $R_1$, $R_2$, and $R_3$ groups may also be a group of the formula Z where Z is as defined above;

X is an organic or inorganic anion (for example, without limitation, halide, sulfate, acetate, phosphate, phosphonate, hydroxide, alkoxide, phenoxide, or bisphenoxide); and n is a number equal to the valence of the anion X.

The polyol crosslinking agents may be any of those polyhydroxy compounds known in the art to function as a crosslinking agent or co-curative for fluoroelastomers, such as those polyhydroxy compounds disclosed in U.S. Pat. No. 4,259,463 (Moggi et al.), U.S. Pat. No. 3,876,654 (Pattison), U.S. Pat. No. 4,233,421 (Worm), and U.S. Defensive Publication T107,801 (Nersasian). Preferred polyols include aromatic polyhydroxy compounds, aliphatic polyhydroxy compounds, and phenol resins.

Representative aromatic polyhydroxy compounds include any one of the following: di-, tri-, and tetrahydroxybenzenes, -naphthalenes, and -anthracenes, and bisphenols of the formula

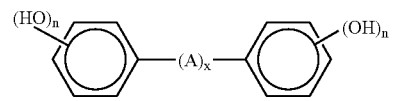

wherein A is a difunctional aliphatic, cycloaliphatic, or aromatic radical of 1 to 13 carbon atoms, or a thio, oxy, carbonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, or bromine atom, or carboxyl or an acyl radical (e.g., —COR, where R is H or a $C_1$ to $C_8$ alkyl, aryl or cycloalkyl group) or alkyl radical with, for example, 1 to 8 carbon atoms. It will be understood from the above bisphenol formula III that the —OH groups can be attached in any position (other than number one) in either ring. Blends of two or more such compounds can also be used. A preferred bisphenol compound is Bisphenol AF, which is 2,2-bis(4-hydroxyphenyl)hexafluoropropane. Other non-limiting examples include 4,4'-dihydroxydiphenyl sulfone (Bisphenol S) and 2,2-bis(4-hydroxyphenyl) propane (Bisphenol A). Aromatic polyhydroxy compound, such as hydroquinone may also be used as curative agents. Further non-limiting examples include catechol, resorcinol, 2-methyl resorcinol, 5-methyl resorcinol, 2-methyl hydroquinone, 2,5-dimethyl hydroquinone, and 2-t-butyl hydroquinone, 1,5-dihydroxynaphthalene and 9,10-dihydroxyanthracene.

Aliphatic polyhydroxy compounds may also be used as a polyol curative. Examples include fluoroaliphatic diols, e.g. 1,1,6,6-tetrahydrooctafluorohexanediol, and others such as those described in U.S. Pat. No. 4,358,559 (Holcomb et al.) and references cited therein. Derivatives of polyhydroxy compounds can also be used such as those described in U.S. Pat. No. 4,446,270 (Guenthner et al.) and include, for example, 2-(4-allyloxyphenyl)-2-(4-hydroxyphenyl)propane. Mixtures of two or more of the polyhydroxy compounds can be used.

Phenol resins capable of crosslinking a rubber polymer can be employed as the polyol curative agent. Reference to phenol resin may include mixtures of these resins, as described in U.S. Pat. Nos. 2,972,600 and 3,287,440. These phenolic resins can be used to obtain the desired level of cure without the use of other curatives or curing agents.

Phenol resin curatives can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylolphenols or phenolic resins, substituted in para-positions with alkyl groups containing 1 to about 10 carbon atoms, are preferred. Useful commercially available phenol resins include alkylphenol-formaldehyde resin, and bromomethylated alkylphenol-formaldehyde resins.

In one embodiment, phenol resin curative agents may be represented by the general formula

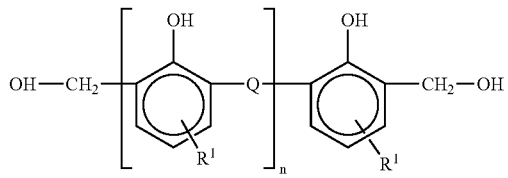

where Q is a divalent radical selected from the group consisting of —CH$_2$— and —CH$_2$—O—CH$_2$—; m is zero or a positive integer from 1 to 20 and R' is hydrogen or an organic radical. Preferably, Q is the divalent radical —CH$_2$—O—CH$_2$—, m is zero or a positive integer from 1 to 10, and R' is hydrogen or an organic radical having less than 20 carbon atoms. In another embodiment, preferably m is zero or a positive integer from 1 to 5 and R' is an organic radical having between 4 and 12 carbon atoms. Other preferred phenol resins are also defined in U.S. Pat. No. 5,952,425.

The cured fluorocarbon elastomer compositions of the invention are prepared by a process of dynamic vulcanization. Dynamic vulcanization is a vulcanization or a curing process for a rubber (here a fluorocarbon elastomer) contained in a thermoplastic composition, wherein the curable rubber is vulcanized under conditions of sufficiently high shear at a temperature above the melting point of the thermoplastic component. In this way, the rubber is simultaneously crosslinked and dispersed within the thermoplastic matrix. Dynamic vulcanization may be carried out by applying mechanical energy to mix the elastomeric and thermoplastic components at elevated temperature in the presence of a curative in conventional mixing equipment, such as roll mills, Moriyama mixers, Banbury mixers, Brabender mixers, continuous mixers, mixing extruders such as single and twin-screw extruders, and the like. An advantageous characteristic of dynamically cured compositions is that, not withstanding that the elastomeric component is fully cured, the composition can be processed and reprocessed by conventional plastic processing techniques such as extrusion, injection molding, and compression molding. Scrap or flashing can also be salvaged and reprocessed with thermoplastic techniques.

The vulcanized elastomeric material that results from the process of dynamic vulcanization is generally present as small particles within a continuous thermoplastic polymer matrix. A co-continuous morphology is also possible depending on the amount of elastomeric material relative to thermoplastic material, the cure system, the mechanism of cure and the amount and degree of mixing.

After dynamic vulcanization, a homogeneous mixture is obtained wherein the cured fluoroelastomer is in the form of dispersed particles having an average particle smaller than about 50 micrometers, preferably of an average particle size smaller than about 25 micrometers. The particle size may be determined from maps prepared by atomic force microscopy on cryogenically microtomed cross-sections of shaped articles formed from the processable rubber composition.

Typically, the particles have an average size of 10 micrometers or less, more preferably 5 micrometers or less as measured with the atomic force microscopy technique. In some embodiments, the particles have an average size of 1 micrometer or less. In other embodiments, even when the average particle size is higher, there will be a significant number of cured elastomer particles with a diameter of less than 1 micron dispersed in the thermoplastic matrix.

In various embodiments, masterbatches of peroxide are prepared for use as the curative to be added to the dynamically vulcanizing system. To make the masterbatch, one can combine a peroxide cure initiator, a fluorocarbon elastomer, and optionally a crosslinking agent. In preferred embodiments, the masterbatch contains from about 5 to about 50% by weight of the peroxide. The masterbatches may be conveniently prepared by combining the ingredients in conventional mixers such as Banbury mixers, and the like. They may also be compounded on screw mixers such as twin-screw extruders. The masterbatches containing fluorocarbon elastomer and peroxide may be added to molten mixtures during the dynamic vulcanization processing batch mixtures or in continuous mixers such as twin-screw extruders.

The fluorocarbon elastomer of the peroxide masterbatch may be chosen to be compatible with mixing in the fluorocarbon elastomer during the dynamic vulcanization process. In typical dynamic vulcanization processes, a fluorocarbon elastomer is mixed together in a molten thermoplastic material. The temperature is typically 10–30° C. higher than the melting point of the thermoplastic. Adding the peroxide curing agent, optionally along with a crosslinking agent containing multiple sites of olefinic unsaturation, in the form of a masterbatch allows for faster incorporation of the peroxide curing agent into the elastomer phase of the dynamic vulcanizate. It is also believed that the fluorocarbon elastomer component of the masterbatch protects the peroxide from bumping and volatilization upon addition to the molten mixture.

In one embodiment, the fluorocarbon elastomer of the peroxide masterbatch and that of the molten mixture are selected to be the same. In this way, the masterbatch containing the peroxide is immediately compatible with the fluorocarbon elastomer of the dynamic vulcanizate. By using the masterbatch method, a portion of the fluorocarbon elastomer to be cured in the dynamic vulcanization process is added along with the peroxide. Recipes for the dynamic vulcanizations, along with the charges of fluorocarbon elastomer during the different steps of the dynamic vulcanization process, can be designed and calculated depending on the concentration of the fluorocarbon elastomer in the masterbatch.

The masterbatch can contain a wide range of peroxide concentrations, but it is usually preferred to make masterbatches having from about 5% up to about 50% by weight peroxide. In some embodiments, it will be desirable to add peroxide in the master batch process in as little fluorocarbon elastomer as possible, so as to achieve desired properties in the fully cured dynamic vulcanizate. In other embodiments, it may be desirable to add more of the fluorocarbon elastomer into the dynamic vulcanization process after the initial melt blending of the fluorocarbon elastomer and the thermoplastic. In these cases, masterbatches having peroxide concentrations toward the lower end of the preferred range may be used.

The masterbatch is blended under conditions such that the blending temperature does not exceed a temperature at which the peroxide would act to cure the fluorocarbon elastomer. Typically, the masterbatch may be blended at temperatures up to 100° C., in order to provide a mixture of low enough viscosity for efficient blending. A preferred temperature range for blending of the masterbatch is 80–100° C. For reactive elastomers, it may be desirable to blend at 80° C. or less.

In a preferred embodiment, plasticizers, extender oils, synthetic processing oils, or a combination thereof may be used in the compositions of the invention. The type of processing oil selected will typically be consistent with that ordinarily used in conjunction with the specific rubber or rubbers present in the composition. The extender oils may include, but are not limited to, aromatic, naphthenic, and paraffinic extender oils. Preferred synthetic processing oils include polylinear α-olefins. The extender oils may also include organic esters, alkyl ethers, or combinations thereof. As disclosed in U.S. Pat. No. 5,397,832, it has been found that the addition of certain low to medium molecular weight organic esters and alkyl ether esters to the compositions of the invention lowers the Tg of the thermoplastic and rubber components, and of the overall composition, and improves the low temperatures properties, particularly flexibility and strength. These organic esters and alkyl ether esters generally have a molecular weight that is generally less than about 10,000. Particularly suitable esters include monomeric and oligomeric materials having an average molecular weight below about 2000, and preferably below about 600. In one embodiment, the esters may be either aliphatic mono- or diesters or alternatively oligomeric aliphatic esters or alkyl ether esters.

In addition to the elastomeric material, the thermoplastic polymeric material, and curative, the processable rubber compositions of this invention may include other additives such as stabilizers processing aids, curing accelerators, fillers, pigments, adhesives, tackifiers, and waxes. The properties of the compositions and articles of the invention may be modified, either before or after vulcanization, by the addition of ingredients that are conventional in the compounding of rubber, thermoplastics, and blends thereof.

A wide variety of processing aids may be used, including plasticizers and mold release agents. Non-limiting examples of processing aids include Caranuba wax, phthalate ester plasticizers such as dioctylphthalate (DOP) and dibutylphthalate silicate (DBS), fatty acid salts such zinc stearate and sodium stearate, polyethylene wax, and keramide. In some embodiments, high temperature processing aids are preferred. Such include, without limitation, linear fatty alcohols such as blends of $C_{10}$–$C_{28}$ alcohols, organosilicones, and functionalized perfluoropolyethers. In some embodiments, the compositions contain about 1 to about 15% by weight processing aids, preferably about 5 to about 10% by weight.

Acid acceptor compounds are commonly used as curing accelerators or curing stabilizers. Preferred acid acceptor compounds include oxides and hydroxides of divalent metals. Non-limiting examples include $Ca(OH)_2$, MgO, CaO, and ZnO.

Non-limiting examples of fillers include both organic and inorganic fillers such as, barium sulfate, zinc sulfide, carbon black, silica, titanium dioxide, clay, talc, fiber glass, fumed silica and discontinuous fibers such as mineral fibers, wood cellulose fibers, carbon fiber, boron fiber, and aramid fiber (Kevlar). Some non-limiting examples of processing additives include stearic acid and lauric acid. The addition of carbon black, extender oil, or both, preferably prior to dynamic vulcanization, is particularly preferred. Non-limiting examples of carbon black fillers include SAF black, HAF black, SRP black and Austin black. Carbon black improves the tensile strength, and an extender oil can improve processability, the resistance to oil swell, heat stability, hysteresis, cost, and permanent set. In a preferred embodiment, fillers such as carboxy block may make up to about 40% by weight of the total weight of the compositions of the invention. Preferably, the compositions comprise 1–40 weight % of filler. In other embodiments, the filler makes up 10 to 25 weight % of the compositions.

The vulcanized elastomeric material, also referred to herein generically as a "rubber," is generally present as small particles within a continuous thermoplastic polymer matrix. A co-continuous morphology is also possible depending on the amount of elastomeric material relative to thermoplastic material, the cure system, and the mechanism and degree of cure of the elastomer and the amount and degree of mixing. Preferably, the elastomeric material is fully crosslinked/cured.

Full crosslinking can be achieved by adding an appropriate curative or curative system to a blend of thermoplastic material and elastomeric material, and vulcanizing or curing the rubber to the desired degree under vulcanizing conditions. In a preferred embodiment, the elastomer is crosslinked by the process of dynamic vulcanization. The term dynamic vulcanization refers to a vulcanization or curing process for a rubber (here a fluorocarbon elastomer) contained in a thermoplastic composition (here the fluoroplastic blend), wherein the curable rubber is vulcanized under conditions of sufficiently high shear at a temperature above the melting point of the thermoplastic component. The rubber is thus simultaneously crosslinked and dispersed within the thermoplastic matrix. Dynamic vulcanization is effected by applying mechanical energy to mix the elastomeric and thermoplastic components at elevated temperature in the presence of a curative in conventional mixing equipment such as roll mills, Moriyama mixers, Banbury mixers, Brabender mixers, continuous mixers, mixing extruders such as single and twin-screw extruders, and the like. An advantageous characteristic of dynamically cured compositions is that, notwithstanding the fact that the elastomeric component is fully cured, the compositions can be processed and reprocessed by conventional plastic processing techniques such as extrusion, injection molding and compression molding. Scrap or flashing can be salvaged and reprocessed. One advantage of the compositions of the invention is that they can be processed at relatively lower temperatures than can compositions made with a single fully fluorinated thermoplastic polymer.

Heating and mixing or mastication at vulcanization temperatures are generally adequate to complete the vulcanization reaction in a few minutes or less, but if shorter vulcanization times are desired, higher temperatures and/or higher shear may be used. A suitable range of vulcanization temperature is from about the melting temperature of the thermoplastic material, which is up to about 300° C. or more. It is preferred that mixing continue without interruption until vulcanization occurs or is complete.

If appreciable curing is allowed after mixing has stopped, an unprocessable thermoplastic vulcanizate may be obtained. In this case, a kind of post curing step may be carried out to complete the curing process. In some embodiments, the post curing takes the form of continuing to mix the elastomer and thermoplastic during a cool-down period.

After dynamic vulcanization, a homogeneous mixture is obtained, wherein the rubber is in the form of small dispersed particles essentially of an average particle size smaller than about 50 μm, preferably of an average particle size smaller than about 25 μm. More typically and preferably, the particles have an average size of about 10 μm or less, preferably about 5 μm or less, and more preferably about 1 μm or less. In other embodiments, even when the average particle size is larger, there will be a significant number of cured elastomer particles less than 1 μm in size dispersed in the thermoplastic matrix.

The size of the particles referred to above may be equated to the diameter of spherical particles, or to the diameter of a sphere of equivalent volume. It is to be understood that not all particles will be spherical. Some particles will be fairly isotropic so that a size approximating a sphere diameter may be readily determined. Other particles may be anisotropic in that one or two dimensions may be longer than another dimension. In such cases, the preferred particle sizes referred to above correspond to the shortest of the dimensions of the particles.

In some embodiments, the cured elastomeric material is in the form of particles forming a dispersed, discrete, or non-continuous phase wherein the particles are separated from one another by the continuous phase made up of the thermoplastic matrix. Such structures are expected to be more favored at relatively lower loadings of cured elastomer, i.e. where the thermoplastic material takes up a relatively higher volume of the compositions. In other embodiments, the cured material may be in the form of a co-continuous phase with the thermoplastic material. Such structures are believed to be favored at relatively higher volume of the cured elastomer. At intermediate elastomer loadings, the structure of the two-phase compositions may take on an intermediate state in that some of the cured elastomer may be in the form of discrete particles and some may be in the form of a co-continuous phase.

The homogenous nature of the compositions, the small particle size indicative of a large surface area of contact between the phases, and the ability of the compositions to be formed into shaped articles having sufficient hardness, tensile strength, modulus, elongation at break, or compression set to be useful in industrial applications, indicate a relatively high degree of compatibility between the elastomer and thermoplastic phases.

The progress of the vulcanization may be followed by monitoring mixing torque or mixing energy requirements during mixing. The mixing torque or mixing energy curve generally goes through a maximum after which mixing can be continued somewhat longer to improve the fabricability of the blend. In certain embodiment, additional ingredients are added after the dynamic vulcanization is complete. The stabilizer package is preferably added to the thermoplastic vulcanizate after vulcanization has been essentially completed, i.e., the curative has been essentially consumed.

The processable rubber compositions of the invention may be manufactured in a batch process or a continuous process. In a batch process, predetermined charges of elastomeric material, fluoroplastic blend, and curative agents are added to a mixing apparatus. In a typical batch procedure, the elastomeric material and fluoroplastic blend are first mixed, blended, masticated or otherwise physically combined until a desired particle size of elastomeric material is provided in a continuous phase of thermoplastic material. When the structure of the elastomeric material is as desired, a curative agent may be added while continuing to apply mechanical energy to mix the elastomeric material and fluoroplastic blend. Curing is effected by heating or continuing to heat the mixing combination of fluoroplastic blend and elastomeric material in the presence of the curative agent. When cure is complete, the processable rubber composition may be removed from the reaction vessel (mixing chamber) for further processing.

It is preferred to mix the elastomeric material and fluoroplastic blend at a temperature where the thermoplastic material softens and flows. If such a temperature is below that at which the curative agent is activated, the curative agent may be a part of the mixture during the initial particle dispersion step of the batch process. In some embodiments, a curative is combined with the elastomeric material and fluoroplastic blend at a temperature below the curing temperature. When the desired dispersion is achieved, the temperature may be increased to effect cure. In one embodiment, commercially available elastomeric materials are used that contain a curative pre-formulated into the elastomer. However, if the curative agent is activated at the temperature of initial mixing (which will generally be the case with the relatively high melting fully fluorinated polymers used in the fluoroplastic blend, it is preferred to leave out the curative until the desired particle size distribution of the elastomeric material in the thermoplastic matrix is achieved. In another embodiment, curative is added after the elastomeric material and fluoroplastic blend are mixed. In a preferred embodiment, the curative agent is added to a mixture of elastomeric particles in the fluoroplastic blend while the entire mixture continues to be mechanically stirred, agitated or otherwise mixed.

Continuous processes may also be used to prepare the processable rubber compositions of the invention. In a preferred embodiment, a twin screw extruder apparatus, either co-rotation or counter-rotation screw type, is provided with ports for material addition and reaction chambers made up of modular components of the twin screw apparatus. In a typical continuous procedure, the fluoroplastic blend and elastomeric material are combined by inserting them into the screw extruder together from a first hopper using a feeder (loss-in-weight or volumetric feeder). Temperature and screw parameters may be adjusted to provide a proper temperature and shear to effect the desired mixing and particle size distribution of an uncured elastomeric component in a thermoplastic material matrix. The duration of mixing may be controlled by providing a longer or shorter length of extrusion apparatus or by controlling the speed of screw rotation for the mixture of elastomeric material and thermoplastic material to go through during the mixing phase. The degree of mixing may also be controlled by the mixing screw element configuration in the screw shaft, such as intensive, medium or mild screw designs. Then, at a downstream port, by using side feeder (loss-in-weight or volumetric feeder), the curative agent may be added continuously to the mixture of fluoroplastic blend and elastomeric material as it continues to travel down the twin screw extrusion pathway. Downstream of the curative additive port, the mixing parameters and transit time may be varied as described above. By adjusting the shear rate, temperature, duration of mixing, mixing screw element configuration, as well as the time of adding the curative agent, processable rubber compositions of the invention may be made in a continuous process. As in the batch process, the elastomeric material may be commercially formulated to contain a curative agent, generally a phenol or phenol resin curative.

The compositions and articles of the invention will contain a sufficient amount of vulcanized elastomeric material ("rubber") to form a rubbery composition of matter, that is, they will exhibit a desirable combination of flexibility, softness, and compression set. Preferably, the compositions should comprise at least about 25 parts by weight rubber, preferably at least about 35 parts by weight rubber, more preferably at least about 40 parts by weight rubber, even more preferably at least about 45 parts by weight rubber, and still more preferably at least about 50 parts by weight rubber per 100 parts by weight of the rubber and thermoplastic polymer combined. The amount of cured rubber within the thermoplastic vulcanizate is generally from about 5 to about 95 percent by weight, preferably from about 35 to about 95 percent by weight, more preferably from about 40 to about 90 weight percent, and more preferably from about 50 to about 80 percent by weight of the total weight of the rubber and the thermoplastic polymer combined.

The amount of fluoroplastic blend within the processable rubber compositions of the invention is generally from about 5 to about 95 percent by weight, preferably from about 10 to about 65 percent by weight and more preferably from about 20 to about 50 percent by weight of the total weight of the rubber and the fluoroplastic blend combined.

As noted above, the processable rubber compositions and shaped articles of the invention include a cured rubber and a thermoplastic polymer comprising or consisting essentially of the fluoroplastic blend described herein. Preferably, the thermoplastic vulcanizate is a homogeneous mixture wherein the rubber is in the form of finely-divided and well-dispersed rubber particles within a non-vulcanized matrix. It should be understood, however, that the thermoplastic vulcanizates of the this invention are not limited to those containing discrete phases inasmuch as the compositions of this invention may also include other morphologies such as co-continuous morphologies. In especially preferred embodiments, the rubber particles have an average particle size smaller than about 50 µm, more preferably smaller than about 25 µm, even more preferably smaller than about 10 µm or less, and still more preferably smaller than about 5 µm.

Advantageously, the shaped articles of the invention are rubber-like materials that, unlike conventional rubbers, can be processed and recycled like thermoplastic materials. These materials are preferably rubber-like to the extent that they will retract to less than 1.5 times their original length within one minute after being stretched at room temperature to twice its original length and held for one minute before release, as defined in ASTM D1566. Also, these materials preferably satisfy the tensile set requirements set forth in ASTM D412, and they also satisfy the elastic requirements for compression set per ASTM D395.

In various embodiments, the cured dynamic vulcanizates of the invention may be made in batch, semi-batch, or continuous processes through the use of peroxide masterbatches to deliver the curing agents to vulcanize the fluorocarbon elastomers. For example, melt processable fluoroelastomer compositions may be made by blending a fluoroplastic blend and a fluorocarbon elastomer to form a first mixture, at a temperature above a temperature at which the thermoplastic will flow sufficiently, to form a dispersion of the fluorocarbon elastomer. Such temperature may be referred to as a melt flow temperature. Next, a second mixture (masterbatch) is provided that contains a fluorocarbon elastomer and preferably greater than about 5% by weight of an organic peroxide. The masterbatch is formulated and manufactured at a temperature below that at which the peroxide would activate to initiate crosslinking of the fluorocarbon elastomer. The first mixture and the second mixtures are then combined and blended together while heating at a temperature and for a time sufficient to effect cure of the fluorocarbon elastomer in the first and second mixtures.

The process may also be carried out continuously, for example in extrusion mixers such as a twin-screw extruder. In one embodiment, a solid blend of an uncured fluorocarbon elastomer and a fluoroplastic blend is delivered to a first feeder of a first twin-screw extrusion apparatus. The solid blend is injected into the barrel of the extruder, with the barrel heated above a temperature at which the thermoplastic will melt and flow, to produce a dispersion of the fluorocarbon elastomer in the thermoplastic. For example, the barrel may be heated above the crystalline melting temperature of the thermoplastic material. In preferred embodiments, the temperature is 10°, 20° or 30° C. higher than the melting temperature of the thermoplastic. The solid blend is then mixed in the twin-screw extruder to form a homogeneous melt blend. A peroxide masterbatch containing greater or equal to 5% by weight of an organic peroxide is then delivered to a second feeder and injected into the barrel of the twin-screw extruder at a point downstream of the first feeder. The peroxide masterbatch and the homogeneous melt blend in the barrel are then further mixed while continuing to heat for a time and at a temperature sufficient to effect cure of the fluorocarbon elastomers. The cured dynamic vulcanizate may then be extruded from the twin-screw extrusion apparatus.

In an alternate embodiment, the peroxide masterbatch may be delivered to the second feeder with a twin-screw extrusion apparatus that blends the organic peroxide, fluorocarbon elastomer, and optional crosslinking agent at a temperature less than that which would activate the peroxide to cure the elastomer. In this way, it is possible to continuously feed a fluorocarbon elastomer and the fluoroplastic blend at a first feeder port, and a curing agent and fluorocarbon elastomer at a second port downstream from the first.

After extrusion from the mixing apparatus, the dynamically vulcanized strand may be cooled in a water bath and chopped into pellets for later use.

EXAMPLES

Examples 1–3 illustrate recipes for making moldable compositions of the invention. They can be made by either batch or continuous processes.

In a batch process, processable rubber compositions are compounded in a batch mixer such as a Banbury mixer, Moriyama mixer, and a Brabender with an internal mixing attachment. The high temperature fluoroplastic (e.g. PFA, with a melting point of about 335° C.) and the low temperature fluoroplastic (e.g. Kynar Flex 2500-20, a copolymer of vinylidene fluoride and HFP with a melting point of about 115° C.) are melted together at 350–380° C. and stirred for 10–15 minutes until a homogeneous fluoroplastic blend is obtained. A fluorinated processing aid (e.g. Tecnoflon FPA-1) and optional compatibilizing agent are added during the mixing stage to improve mixing efficiency. Fluorocarbon elastomer is then added to the mixer, and continuously mixed with the thermoplastic blend for 10–15 minutes at a rotor speed of 50 rpm. Then the other ingredients are added. If the elastomers are not cure incorporated, curing agent may also be added at this time. Stirring continues for an additional time required to achieve full cure of the elastomer, as determined for example by reaching a steady state torque reading in the mixer. The composition is then discharged from the batch mixer and granulated to make small size pellets for use in subsequent fabrication processes, such as injection molding, compression molding, blow molding, single layer extrusion, multi-layer extrusion, insert molding, and the like.

A continuous process is carried out in a twin-screw extruder. Pellets of the high temperature fluoroplastic and the low temperature fluoroplastic are mixed separately and added to the extruder hopper. The pellets are fed into the barrel, which is heated to 350–380° C., along with the processing and optional compatibilizing agent. The plastic mixture is melted in the melting zone of the extruder barrel, compressed in the compression zone, and mixed in the first mixing zone. Fluorocarbon elastomer (as chopped pellets) is fed into the barrel from a first side feeding zone hopper, which is downstream of the first mixing zone. The elastomer pellets are melted in the barrel and mixed with the molten fluoroplastic mixture as the screws are rotated to push the molten plastic/elastomer mixture into the second mixing zone. The rest of the ingredients are added at a second side feeding zone that is downstream of the second mixing zone. Typical residence time is about 10–15 minutes in the barrel at a screw speed of 150–200 rpm. The temperature is maintained at 350–380° C. The cured elastomer/fluoroplastic blend is extruded through a 1–3 mm diameter strand die and is quenched by cooling in a water bath before passing through a strand pelletizer. The pellets may be processed by a wide variety of thermoplastic techniques into molded articles. The material may also be formed into plaques for the measurement of physical properties.

In Examples 1–3, the following materials are used:

Tecnoflon FOR 50HS and FOR 80HS are no (low) post cure bisphenol curable fluorocarbon elastomers from Solvay, with bisphenol curing agent formulated into the resin.

Kynar Flex 2500-20 is a vinylidene fluoride/HFP copolymer based thermoplastic from Atofina Chemicals.

Elastomag 170 is a magnesium hydroxide powder from Rohm and Haas.

MT Black is a carbon black filler.

Struktol WS-280 is a processing aid from Struktol.

Tecnoflon FPA-1 is a high temperature processing aid from Solvay.

Fluorel FE 5840 is a high fluorine (70% F) cure incorporated fluoroelastomer from Dyneon.

Dyneon BRE 7231X is a base resistant cure incorporated fluoroelastomer from Dyneon. It is based on a terpolymer of TFE, propylene, and vinylidene fluoride.

PFA is a copolymer of TFE and perfluoropropyl vinyl ether.

Rhenofit CF is a calcium hydroxide from Rhein Chemie.

Austin Black is a carbon black filler.

Example 1

| Ingredient | Ex 1a phr | Ex 1b phr | Ex 1c phr | Ex 1d phr | Ex 1e phr |
|---|---|---|---|---|---|
| Fluorel FE5840 | 70.0 | 70.0 | 70.0 | 70.0 | 70.0 |
| Dyneon BRE 7231X | 30.0 | 30.0 | 30.0 | 30.0 | 30.0 |
| Kynar Flex 2500-20 | 10.0 | 30.0 | 50.0 | 70.0 | 90.0 |
| PFA | 90.0 | 70.0 | 50.0 | 30.0 | 10.0 |
| Rhenofit CF | 6.0 | 6.0 | 6.0 | 6.0 | 6.0 |
| Elastomag 170 | 3.0 | 3.0 | 3.0 | 3.0 | 3.0 |
| Struktol WS-280 | 1.0 | 1.0 | 1.0 | 1.0 | 1.0 |
| Austin Black | 10.00 | 10.00 | 10.00 | 10.00 | 10.00 |
| Tecnoflon FPA-1 | 1.00 | 1.00 | 1.00 | 1.00 | 1.00 |
| melting point (DSC), ° C. | 240 | 240 | 241 | 240 | 239 |

The melting point of the compositions of Example 1 is determined by differential scanning calorimetry. A sample of the moldable rubber composition is heated above 260° C., and the endothermic heat flow is measured on cooling to determine the DSC melting point. Shaped articles are prepared by thermoplastic processing the compositions. The compositions are heated to about 260–270° C. (about 20–30° C. above the DSC melting temperature) and made into shaped articles by thermoplastic techniques such as extrusion, injection molding, compression molding, insertion molding, and thermoforming.

Example 2

| Ingredient | Ex 4a phr | Ex 4b phr | Ex 4c phr | Ex 4d phr | Ex 4e phr |
|---|---|---|---|---|---|
| Fluorel FE5840 | 70.0 | 70.0 | 70.0 | 70.0 | 70.0 |
| Dyneon BRE 7231X | 30.0 | 30.0 | 30.0 | 30.0 | 30.0 |
| Kynar Flex 2500-20 | 5.0 | 10.0 | 12.5 | 15.0 | 20.0 |
| PFA | 20.0 | 15.0 | 12.5 | 10.0 | 5.0 |
| Rhenofit CF | 6.0 | 6.0 | 6.0 | 6.0 | 6.0 |
| Elastomag 170 | 3.0 | 3.0 | 3.0 | 3.0 | 3.0 |
| Struktol WS-280 | 1.0 | 1.0 | 1.0 | 1.0 | 1.0 |
| Austin Black | 10.00 | 10.00 | 10.00 | 10.00 | 10.00 |
| Tecnoflon FPA-1 | 1.00 | 1.00 | 1.00 | 1.00 | 1.00 |

| Ingredient | Ex 5a phr | Ex 5b phr | Ex 5c phr | Ex 5d phr | Ex 5e phr |
|---|---|---|---|---|---|
| Tecnoflon FOR 80HS | 100.0 | 100.0 | 100.0 | 100.0 | 100.0 |
| Kynar Flex 2500-20 | 5.0 | 10.0 | 12.5 | 10.0 | 5.0 |
| PFA | 20.0 | 15.0 | 12.5 | 10.0 | 5.0 |
| Elastomag 170 (MgO) | 3.0 | 3.0 | 3.0 | 3.0 | 3.0 |

-continued

| Ingredient | Ex 5a phr | Ex 5b phr | Ex 5c phr | Ex 5d phr | Ex 5e phr |
|---|---|---|---|---|---|
| MT Black (N990) | 30.00 | 30.00 | 30.00 | 30.00 | 30.00 |
| Struktol WS-280 | 1.00 | 1.00 | 1.00 | 1.00 | 1.00 |
| Tecnoflon FPA-1 | 1.00 | 1.00 | .00 | 1.00 | 1.00 |

Molded articles prepared from the cured compositions of Examples 2 and are prepared by conventional plastic processing techniques.

Although the invention has been described in light of various embodiments including those currently considered to be the most advantageous or preferred for carrying out the invention, it is to be understood that the invention is not limited to the disclosed embodiments. Rather, variations and modifications that will occur to one of skill in the art upon reading the disclosure are intended to be within the scope of the invention, which is defined in the appended claims.

What is claimed is:

1. A processable rubber composition comprising a cured fluorocarbon elastomer dispersed in a matrix comprising a thermoplastic material, wherein:
   the thermoplastic material comprises a fully fluorinated melt-processable thermoplastic polymer and a partially fluorinated melt-processable thermoplastic polymer; and
   the cured fluorocarbon elastomer is present at a level of greater than or equal to 35% by weight based on the total weight of cured fluorocarbon elastomer and thermoplastic material.

2. A composition according to claim 1, wherein the cured fluorocarbon elastomer is present at a level of greater than or equal to 50% by weight.

3. A composition according to claim 1, wherein the composition exhibits a single melting temperature of less than 305° C.

4. A composition according to claim 3, wherein the composition exhibits a single melting temperature of less than 290° C.

5. A composition according to claim 4, wherein the composition exhibits a single melting temperature of less than 250° C.

6. A composition according to claim 1, wherein the thermoplastic material comprises more than 60 wt % fluorine.

7. A composition according to claim 1, wherein the thermoplastic material comprises 10–90% by weight of the fully fluorinated polymer.

8. A composition according to claim 1, wherein the ratio of the weight of the fully fluorinated polymer to the weight of the partially fluorinated polymer in the matrix ranges from 1:9 to 9:1.

9. A composition according to claim 8, wherein the ratio of the weight of the fully fluorinated polymer to the weight of the partially fluorinated polymer in the matrix ranges from 1:2 to 2:1.

10. A method according to claim 1, wherein the fluorocarbon elastomer comprises repeating units derived from vinylidene fluoride and hexafluoropropylene.

11. A method according to claim 10, wherein the fluorocarbon elastomer further comprises repeating units derived from tetrafluoroethylene.

12. A composition according to claim 1, wherein the fluorocarbon elastomer is selected from the group consisting of: VDF/HFP, VDF/HFP/TFE, VDF/PFVE/TFE, TFE/Pr, TFE/Pr/VDF, TFE/Et/PFVE/VDF, TFE/Et/PFVE, TFE/PFVE, and mixtures thereof.

13. A composition according to claim 12, wherein the fluorocarbon elastomer also comprises cure site monomers.

14. A composition according to claim 1, wherein the thermoplastic material comprises a fully fluorinated polymer selected from the group consisting of PFA, MFA and FEP, and a partially fluorinated polymer selected from the group consisting of polyvinylidene fluoride and copolymers of vinylidene fluoride.

* * * * *